(12) United States Patent
Lyu

(10) Patent No.: US 7,968,002 B2
(45) Date of Patent: Jun. 28, 2011

(54) LIQUID CRYSTAL DISPLAY AND METHOD FOR MANUFACTURING THE SAME

(75) Inventor: Jae-Jin Lyu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/833,308

(22) Filed: Jul. 9, 2010

(65) Prior Publication Data

US 2010/0271581 A1  Oct. 28, 2010

Related U.S. Application Data

(63) Continuation of application No. 11/932,992, filed on Oct. 31, 2007, now Pat. No. 7,771,613.

(30) Foreign Application Priority Data

Apr. 24, 2007 (KR) .................. 10-2007-0039846

(51) Int. Cl.
 C09K 19/38 (2006.01)
 C09K 19/52 (2006.01)
 C09K 19/54 (2006.01)

(52) U.S. Cl. .................. 252/299.01; 252/299.5

(58) Field of Classification Search ............ 252/299.01, 252/299.5
See application file for complete search history.

(56) References Cited

U.S. PATENT DOCUMENTS 6,181,402 B1  1/2001 Shim et al.
(Continued)

FOREIGN PATENT DOCUMENTS

JP  08-041461  2/1996
(Continued)

OTHER PUBLICATIONS

English Abstract for Publication No. WO03087261 (for 10-0677804), 2007.
(Continued)

*Primary Examiner* — Shean C Wu
(74) *Attorney, Agent, or Firm* — F. Chau & Associates, LLC

(57) ABSTRACT liquid crystal display panel includes: a first substrate and a second substrate facing each other, a first field-generating electrode and a second field-generating electrode formed on at least one of the first substrate and the second substrates, a homeotropic alignment layer formed on the first field-generating electrode and the second field-generating electrode and a liquid crystal material formed between the first substrate and the second substrate. The liquid crystal display panel further includes a polymer fixing a pre-tilt angle of liquid crystal molecules of the liquid crystal material, wherein the polymer is formed by polymerizing at least one selected from monomers represented by Chemical Formulas (I), (II), (III), and (IV).

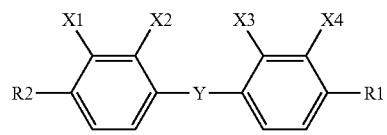

(I)

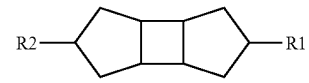

(II)

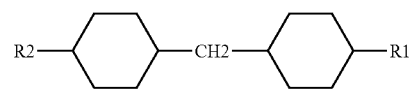

(III)

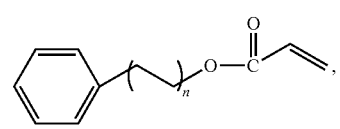

(IV)

wherein, each of R1 and R2 includes at least one of acrylate, a vinyl group, and an epoxy group, n is 0 to 2, each of X1 to X4 is hydrogen or fluorine, Y is at least one selected from $-CH_2-$, $-O-$, $-CO-$, $-C(CF_3)_2-$, and a single bond.

6 Claims, 9 Drawing Sheets

U.S. PATENT DOCUMENTS

| | | |
|---|---|---|
| 6,582,626 B2 | 6/2003 | Hasebe et al. |
| 7,070,711 B2 | 7/2006 | Seki et al. |
| 7,090,901 B2 | 8/2006 | Chien et al. |
| 7,169,449 B2 * | 1/2007 | Nakanishi et al. ............. 428/1.3 |
| 7,771,613 B2 * | 8/2010 | Lyu .......................... 252/299.01 |

FOREIGN PATENT DOCUMENTS

| | | |
|---|---|---|
| JP | 08-283718 | 10/1996 |
| JP | 09-053074 | 2/1997 |
| JP | 2002-098943 | 4/2002 |
| JP | 2004-285174 | 10/2004 |
| JP | 2004-302061 | 10/2004 |
| JP | 2004-323412 | 11/2004 |
| JP | 2005-024909 | 1/2005 |
| JP | 2006-145992 | 6/2006 |
| KR | 100247640 | 12/1999 |
| KR | 10-2005-0009294 | 1/2005 |
| KR | 1020050075307 | 7/2005 |
| KR | 1020060047314 | 5/2006 |
| KR | 10-0677804 | 1/2007 |
| KR | 1020070021258 | 2/2007 |

OTHER PUBLICATIONS

English Abstract for Publication No. (WO03087261 (for 10-2005-0009294) ,2005.

English Abstract for Publication No. WO2005116165 (for 10-2007-0021258) ,2007.

* cited by examiner

LIQUID CRYSTAL DISPLAY AND METHOD FOR MANUFACTURING THE SAME

CROSS-REFERENCE TO RELATED APPLICATION

This application is a continuation of U.S. patent application Ser. No. 11/932,992 filed Oct. 31, 2007, now U.S. Pat. No. 7,771,613 which claims priority to Korean Patent Application No. 10-2007-39846, filed on Apr. 24, 2007, the disclosures of which are each hereby incorporated by reference herein in their entireties.

BACKGROUND OF THE INVENTION (a) Technical Field of the Invention

The present disclosure relates to a liquid crystal display and a method of manufacturing the same.

(b) Description of the Related Art

A liquid crystal display (LCD) is one of the most widely used flat panel displays. An LCD typically includes two panels provided with field-generating electrodes, such as pixel electrodes and a common electrode, and a liquid crystal (LC) layer interposed therebetween. The LCD displays images by applying voltages to the field-generating electrodes to generate an electric field in the LC layer, which determines the orientation of LC molecules in the LC layer to adjust polarization of incident light.

Among LCDs, a vertical alignment (VA) mode LCD, which aligns the LC molecules such that the long axes of the LC molecules are perpendicular to the panels in the absence of an electric field, is spotlighted because of its high contrast ratio and wide reference viewing angle.

The wide viewing angle of the VA mode LCD can be realized by cutouts in the field-generating electrodes. As the cutouts may determine the tilt directions of the LC molecules by the fringe field generated on the edges of the field-generating electrodes with reference to the cutouts, the tilt directions can be distributed in several directions by using the cutouts such that the reference viewing angle is widened.

While, the LC molecules disposed close to the cutouts may be readily aligned by the fringe field with a perpendicular direction to the fringe field, the LC molecules disposed far from the cutouts may be aligned with a random motion. Therefore, the LCDs having the cutouts may have a large response time and an instantaneous afterimage may generated by the irregular domains.

SUMMARY OF THE INVENTION

Exemplary embodiments of the present invention improve the response time of the LC molecules and remove the instantaneous afterimage by adjusting the random motion of the LC molecules.

In accordance with an exemplary embodiment of the present invention, a liquid crystal display panel is provided. The liquid crystal display panel includes a first substrate and a second substrate facing each other, a first field-generating electrode and a second field-generating electrode formed on at least one of the first substrate and the second substrate, a homeotropic alignment layer formed on the first field generating electrode and the second field-generating electrode, a liquid crystal material formed between the first substrate and the second substrate, and a polymer fixing a pre-tilt angle of liquid crystal molecules of the liquid crystal materials.

Herein, the polymer is formed by polymerizing at least one selected from monomers represented by Chemical Formulas (I), (II), (III), and (IV).

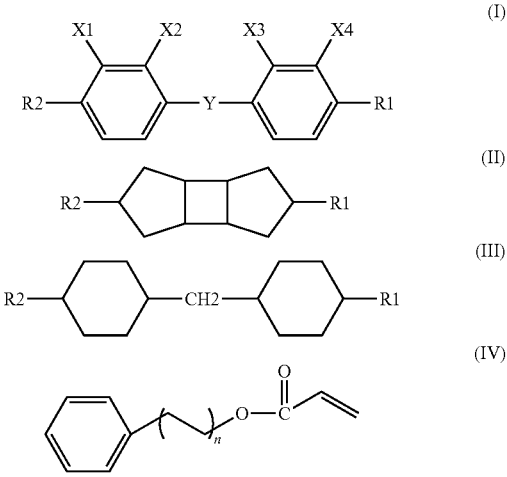

Herein, each of R1 and R2 includes at least one of acrylate, a vinyl group, and an epoxy group, n is 0 to 2, each of X1 to X4 is hydrogen or fluorine, Y is at least one selected from —$CH_2$—, —O—, —CO—, and —$C(CF_3)_2$—, and a single bond.

The polymer may be formed close to the homeotropic alignment layers, and the contents of the monomers may be in the range of about 0.05 to about 0.5 wt % with respect to the contents of the liquid crystal materials.

At least one of the first field-generating electrode and second field-generating electrode may have a plurality of cutouts.

The cutouts may have a plurality of first to fourth micro slits respectively extended in first to fourth directions.

The first field-generating electrode may have the first to fourth micro slits, and the second field-generating electrode may not have the micro slits.

The polymer may be formed of partitions dividing the liquid crystal materials into a plurality of domains.

The contents of the monomers may be in the range of about 2 to about 10 wt % with respect to the contents of the liquid crystal materials.

The first and second field-generating electrodes may not have cutouts.

The liquid crystal molecules of the liquid crystal materials may have a pre-tilt angle in the range of about 88 to about 90 degrees.

In accordance with an exemplary embodiment of the present invention, a liquid crystal display panel is provided. The liquid crystal display panel includes a first substrate and a second substrate facing each other, a first field-generating electrode and a second field-generating electrode formed on at least one of the first substrate and the second substrate and having a plurality of micro slits, a homeotropic alignment layer formed on the first field-generating electrode and the second field-generating electrode, and a liquid crystal mixture formed between the first substrate and the second substrate and including a liquid crystal material and a polymer that fix a pre-tilt angle of liquid crystal molecules of the liquid crystal material.

Herein, the polymer is formed by polymerizing at least one selected from monomers represented by Chemical Formulas (I), (II), (III), and (IV).

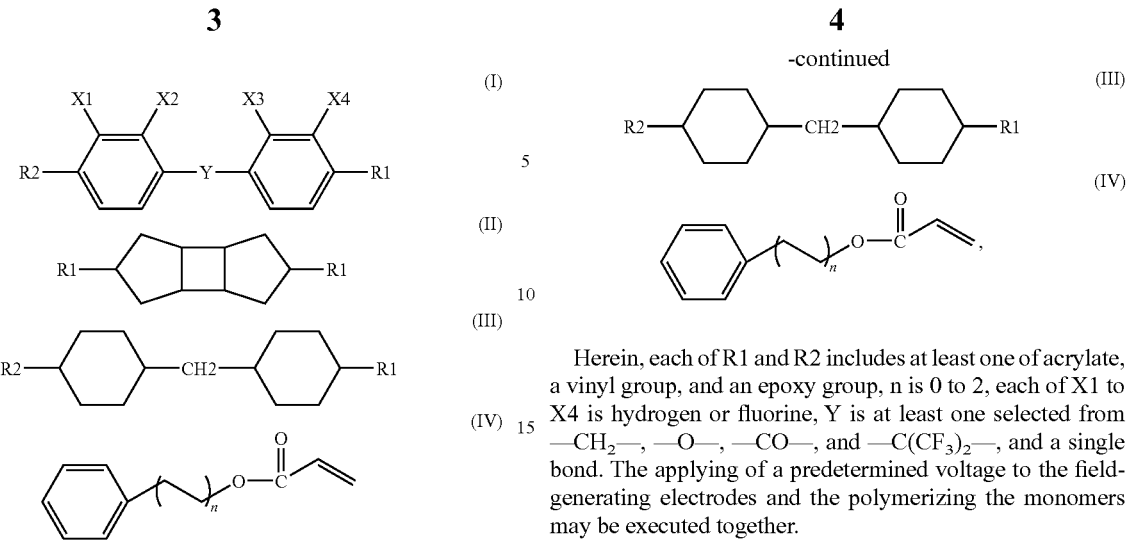

Herein, each of R1 and R2 includes at least one of acrylate, a vinyl group, and an epoxy group, n is 0 to 2, each of X1 to X4 is hydrogen or fluorine, Y is at least one selected from —$CH_2$—, —O—, —CO—, —$C(CF_3)_2$—, and a single bond. The liquid crystal molecules of the liquid crystal material may have a pre-tilt angle in the range of about 88 to about 90 degrees.

The micro slits may be extended in four directions.

At least one of the first field-generating electrode and second field-generating electrode may include a transverse portion, a longitudinal portion, and a plurality of oblique portions extended in four directions, and the widths of the oblique portions are narrower than the widths of the transverse and longitudinal portions.

The polymer may be disposed close to the homeotropic alignment layers.

The contents of the monomers may be in the range of about 0.05 to about 0.5 wt % with respect to the contents of the liquid crystal materials.

In accordance with an exemplary embodiment of the present invention, a method for manufacturing a liquid crystal display panel is provided. The method includes: providing a liquid crystal mixture including a liquid crystal material, a monomers, and a photo initiator between a first panel and a second panel having field-generating electrodes; applying a predetermined voltage to the field-generating electrodes; and polymerizing the monomers by irradiating light to the liquid crystal mixture.

Herein, the monomers are at least one selected from compounds represented by Chemical Formulas (I), (II), (III), and (IV).

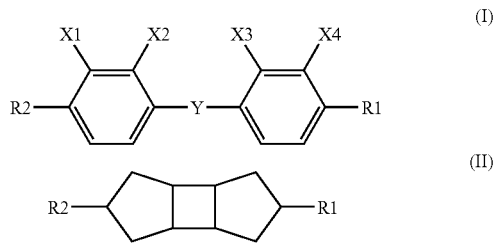

Herein, each of R1 and R2 includes at least one of acrylate, a vinyl group, and an epoxy group, n is 0 to 2, each of X1 to X4 is hydrogen or fluorine, Y is at least one selected from —$CH_2$—, —O—, —CO—, and —$C(CF_3)_2$—, and a single bond. The applying of a predetermined voltage to the field-generating electrodes and the polymerizing the monomers may be executed together.

The predetermined voltage may be in the range of about 3 to about 3.5 V.

The contents of the monomers may be in the range of about 0.05 to about 0.5 wt % with respect to the contents of the liquid crystal material, and the contents of the monomers may be in the range of about 2 to about 10 wt % with respect to the contents of the liquid crystal material.

The polymerizing of the monomers may be executed using a mask having a plurality of micro slits.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENTS OF THE INVENTION

Figure 1:
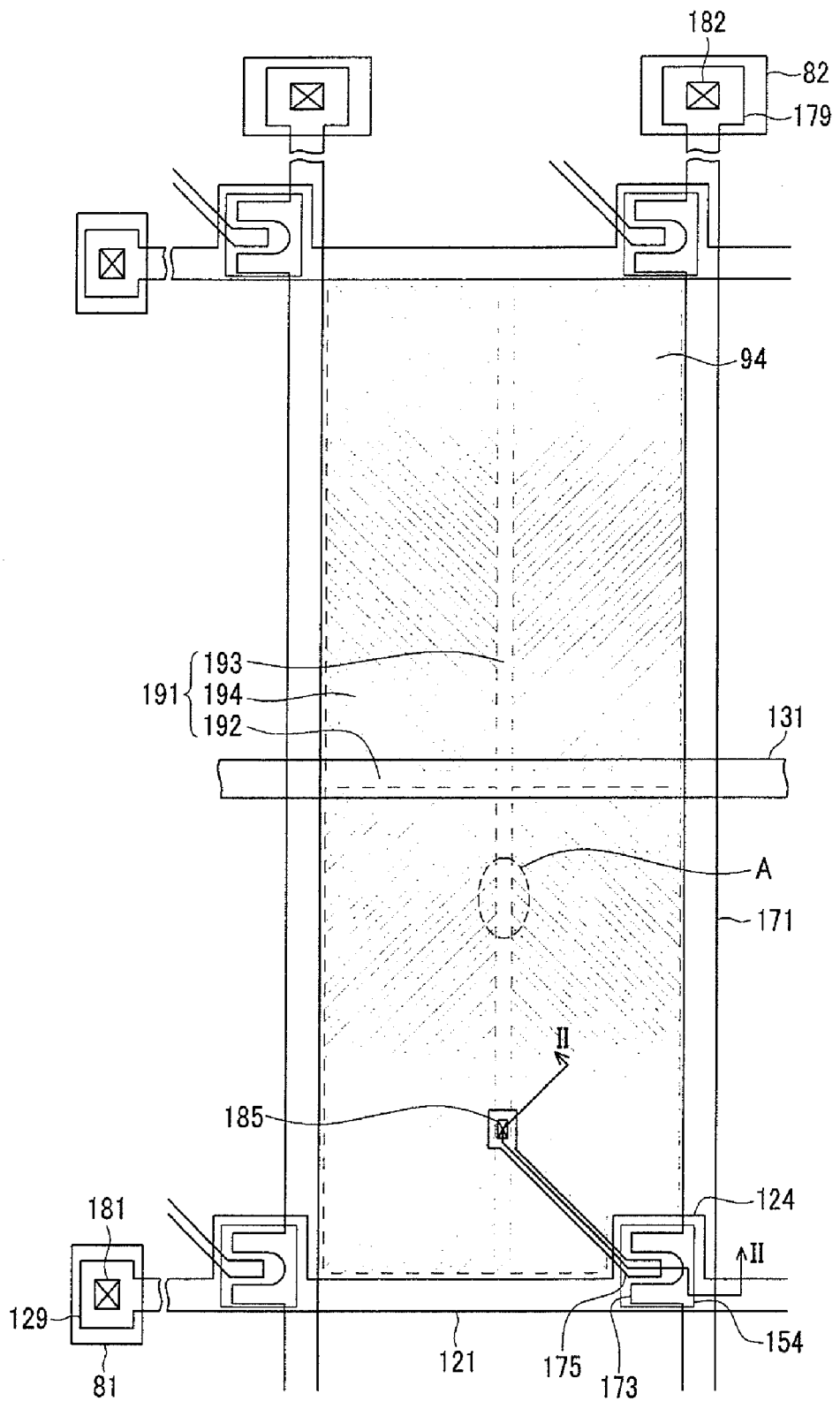
FIG. 1 is a layout view of an LCD according to an exemplary embodiment of the present invention.

The present invention will now be described more fully hereinafter with reference to the accompanying drawings, in which exemplary embodiments of the invention are shown. The present invention may, however, be embodied in many different forms and should not be construed as limited to the exemplary embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, an LCD according to exemplary embodiments of the present invention will be described with reference to FIGS. 1 to 3.

Figure 2:
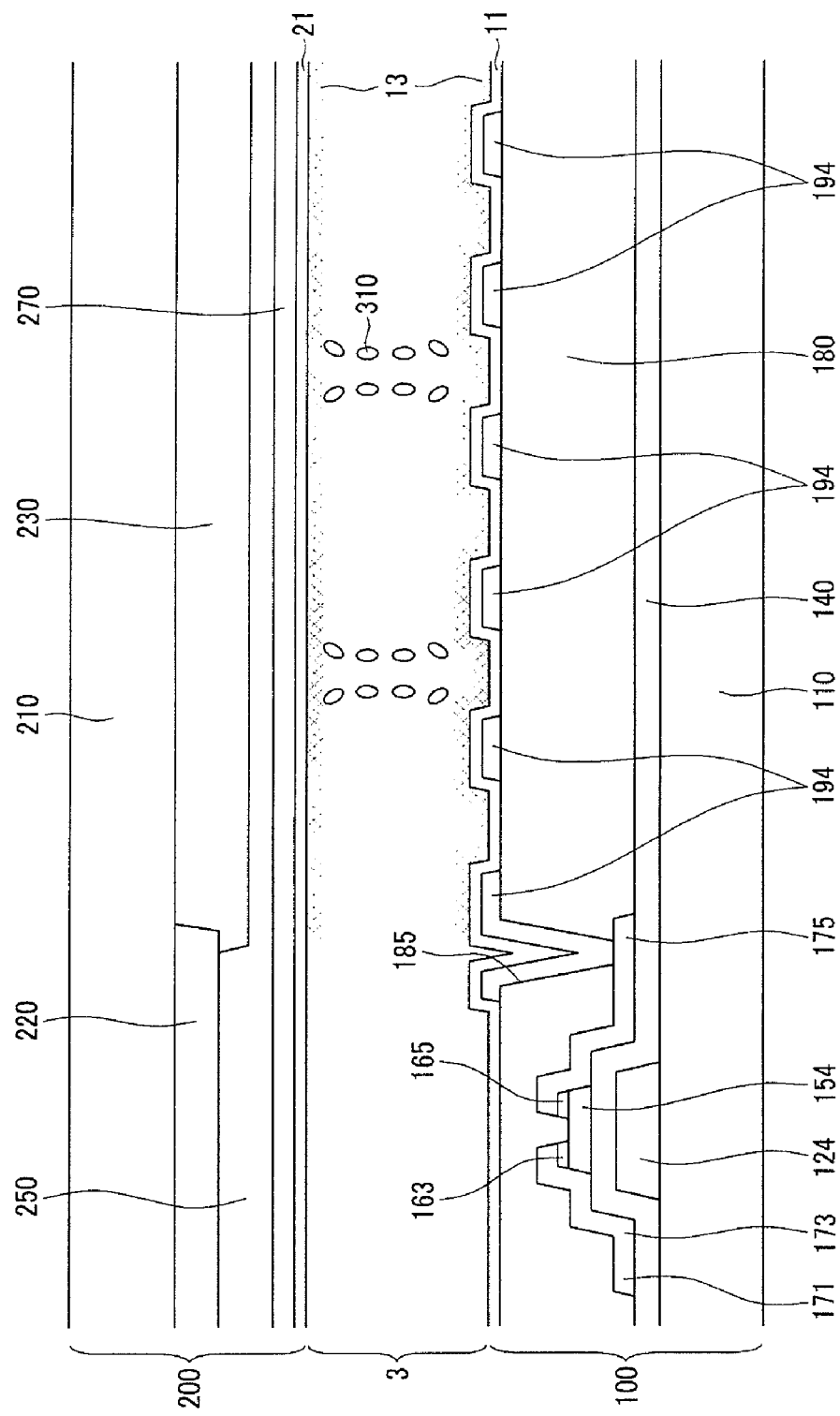
FIG. 2 is a sectional view of the LCD shown in FIG. 1 taken along the line II-II.
Figure 3:
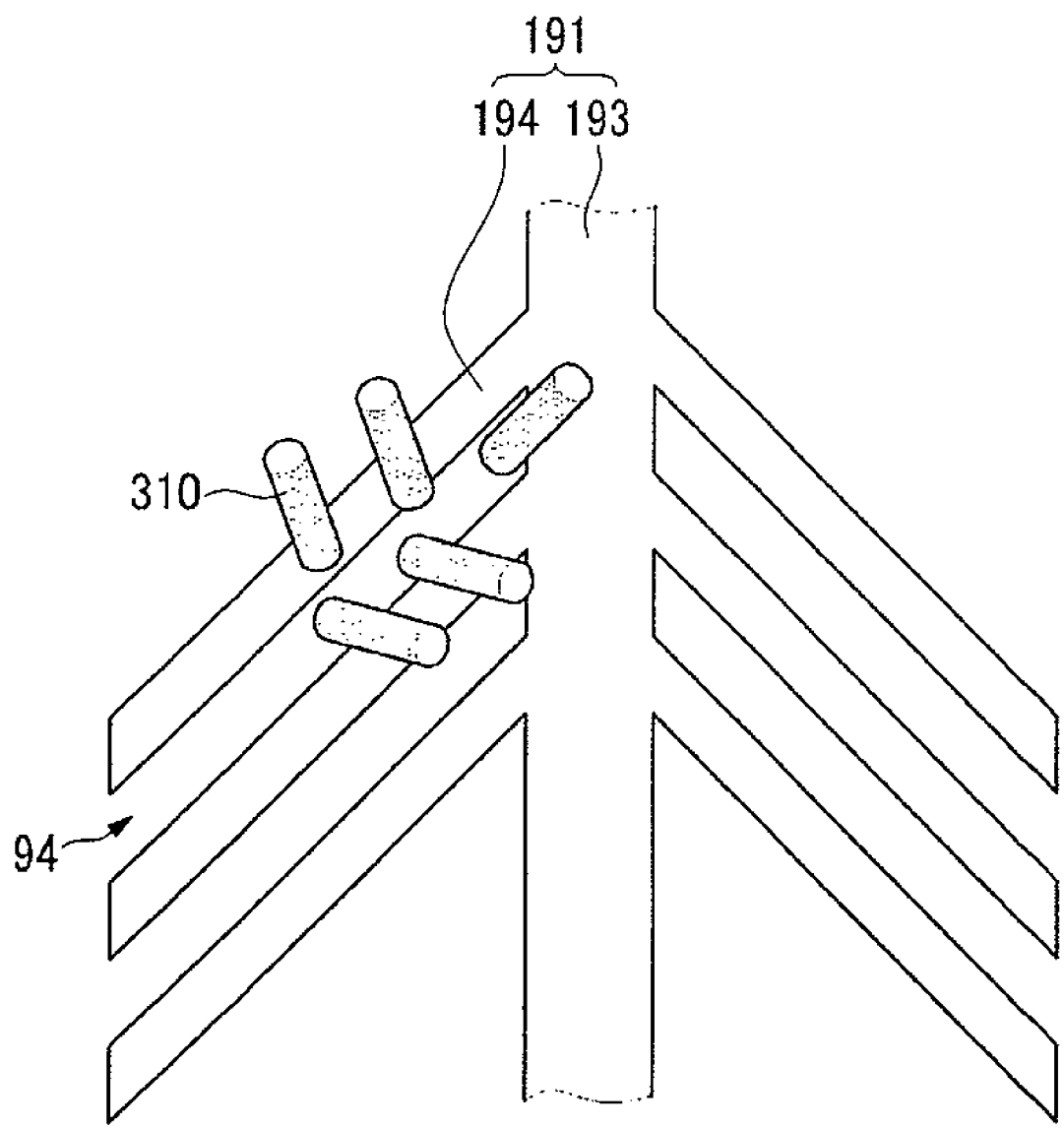
FIG. 3 is an enlarged view of the "A" portion of the LCD shown in FIG. 1.

FIG. 1 is a layout view of an LCD according to an exemplary embodiment of the present invention, FIG. 2 is a sectional view of the LCD shown in FIG. 1 taken along the line II-II, and FIG. 3 is an enlarged view of the "A" portion of the LCD shown in FIG. 1.

An LCD according to an exemplary embodiment of the present invention includes a TFT array panel 100, a common electrode panel 200, and an LC layer 3 interposed between the panels 100 and 200.

The TFT array panel 100 is now described in detail with reference FIGS. 1, 3, 4, and 5.

A plurality of gate lines 121 and a plurality of storage electrode lines 131 are formed on an insulating substrate 110 such as transparent glass.

The gate lines 121 for transmitting gate signals (scanning signals) extend substantially in a transverse direction and are separated from each other and transmit gate signals. Each gate line 121 includes a plurality of projections forming a plurality of gate electrodes 124 and an end portion 129 having a large area for contact with another layer or an external driving circuit.

Each of the storage electrode lines 131 for receiving predetermined signals extends substantially in the transverse direction and is disposed between two adjacent gate lines 121.

A gate insulating layer 140 made of, for example, silicon nitride ($SiN_x$) is formed on the gate lines 121 and the storage electrode lines 131.

A plurality of semiconductors 154 made of, for example, hydrogenated amorphous silicon (abbreviated to "a-Si") or polysilicon are formed on the gate insulating layer 140. Each semiconductor 154 is disposed on the gate electrodes 124. A plurality of ohmic contacts 163 and 165 made of, for example, silicide or n+hydrogenated a-Si heavily doped with an n-type impurity such as, for example, phosphorous are formed on the semiconductors 154. The ohmic contacts 163 and 165 are located in pairs on the semiconductors 154.

A plurality of data lines 171 and a plurality of drain electrodes 175 are formed on the ohmic contacts 163 and 165 and the gate insulating layer 140.

The data lines 171 for transmitting data voltages extend substantially in the longitudinal direction and cross the gate lines 121 and the storage electrode lines 131. Each data line 171 includes an end portion 179 having a large area for contact with another layer or an external device, and a plurality of source electrodes 173 projecting toward the gate electrodes 124.

The drain electrodes 175 are separated from the data lines 171 and are opposite the source electrodes 173 with the respect to the gate electrodes 124. Each drain electrode 175 includes an end portion having a large area for contact with another layer and another end portion disposed on a gate electrode 124 and partly enclosed by a source electrode 173.

A gate electrode 124, a source electrode 173, and a drain electrode 175, along with a semiconductor 154, form a TFT having a channel formed in the semiconductor 154 disposed between the source electrode 173 and the drain electrode 175.

A passivation layer 180 is formed on the data lines 171, the drain electrodes 175, and the exposed portions of the semiconductors 154. The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 171.

A plurality of pixel electrodes 191 and a plurality of contact assistants 81 and 82 are formed on the passivation layer 180.

Each pixel electrode 191 is disposed in a pixel defined by the gate line 121 and the data line 171, and overlaps the storage electrode line 131 to form a storage capacitor.

Each pixel electrode 191 includes a transverse portion 192, a longitudinal portion 193, and a plurality of oblique portions 194 extended from the transverse and longitudinal portions 192 and 193 in an oblique direction.

The transverse and longitudinal portions 192 and 193 divide each pixel electrode 191 into four regions, and the four regions respectively form a domain where the directors of the liquid crystal molecules are aligned with a predetermined direction in a group by the electric field generated between the pixel electrodes 191 and the common electrode 270.

The oblique portions 194 are respectively disposed in four regions divided by the transverse and longitudinal portions 192 and 193. Also, the oblique portions 194 obliquely extend with left upper, left lower, right upper, and right lower directions and are symmetrical with respect to the transverse and longitudinal portions 192 and 193. The oblique portions 194 in each domain are parallel to each other, and may form about a 45 degree angle with the polarization axes of polarizers, which are described after.

A plurality of micro slits 94 defined by the oblique portions 194 are formed, and are symmetrical with respect to the transverse and longitudinal portions 192 and 193. The widths of the oblique portions 194 may be narrower than the widths of the transverse and longitudinal portions 192 and 193.

As shown in FIG. 3, the liquid crystal molecules 310 are aligned symmetrically with respect to the micro slits 94.

The pixel electrodes 191 are physically and electrically connected to the drain electrodes 175 through the contact holes 185 such that the pixel electrodes 191 receive the data voltages from the drain electrodes 175.

The pixel electrodes 191 supplied with the data voltages generate electric fields in cooperation with the common electrode 270, which determine the orientations of the liquid crystal molecules in the liquid crystal layer 3.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The description of the common electrode panel 200 facing the TFT array panel 100 follows with reference to the drawings.

A light blocking member 220 called a black matrix for preventing light leakage between the pixel electrodes 191 is formed on an insulating substrate 210 made of a material such as, for example, transparent glass. The light blocking member 220 may include linear portions corresponding to the data lines 171 and the gate lines 121, and other portions corresponding to the TFTs.

A plurality of color filters 230 are formed on the substrate 210 and they are disposed substantially in the areas enclosed by the light blocking member 220. The color filters 230 may represent one of the primary colors such as red, green, and blue colors.

An overcoat 250 for preventing the color filters 230 from being exposed and for providing a flat surface is formed on the color filters 230 and the light blocking member 220, and a common electrode 270 is formed on the overcoat 250.

The common electrode 270 does not have a slope member for determining the slope direction of the liquid crystal molecules 310, such as cutouts and protrusions.

Alignment layers 11 and 21 that may be homeotropic are coated on inner surfaces of the panels 100 and 200. The alignment layers 11 and 21 may be made of, for example, polyimide and guide the directors of the liquid crystal molecules 310 to be aligned in the perpendicular direction with the respect to the electric field generated between the common and pixel electrodes 270 and 191.

Polarizers 12 and 22 are provided on outer surfaces of the panels 100 and 200 such that their polarization axes may cross, and one of the transmissive axes may make an angle of about 45 degrees to the oblique portions 194 of the pixel electrodes 191.

The LC layer 3 includes the liquid crystal molecules 310 and a pre-tilt fixing polymer 13.

The LC layer 3 may be, for example, a nematic liquid crystal material having negative dielectric anisotropy.

The liquid crystal molecules 310 disposed close to the panels 100 and 200 are pre-tilted with a pre-tilt angle of about 88-90 degrees, and for example about 88.5-90 degrees, with the surface of the substrates 110 and 210. This pre-tilt angle may be formed by a predetermined electric field applied to the electrodes 191 and 270 in the manufacturing process. The predetermined electric field may be larger than about 50% of the driving voltage of the display device. For example, when the driving voltage is in the range of about 5.0 to about 7.0 V, the predetermined electric field for forming the pre-tilt angle is in the range of about 3.0 to about 3.5 V.

The pre-tilt fixing polymer 13 may be formed close to the alignment layers 11 and 21 such that the pre-tilt fixing polymer 13 may fix the pre-tilt angle of the liquid crystal molecules 310 disposed close to the panels 100 and 200.

The pre-tilt fixing polymer 13 may be formed by polymerizing a monomer. Here, the monomer should not have any interference upon the physical and chemical characteristics of the liquid crystal molecules 310 and should readily fix the pre-tilt angel of the liquid crystal molecules 310.

The chemical compound of the monomer may be represented by Chemical Formula (I):

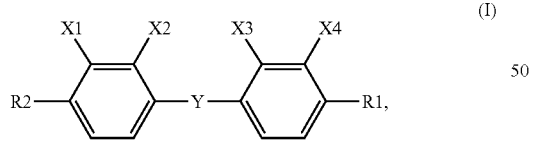

(I)

wherein, each of R1 and R2 includes at least one of acrylate, a vinyl group, and an epoxy group, each of X1 to X4 is hydrogen or fluorine, and Y is at least one selected from —CH$_2$—, —O—, —CO—, —C(CF$_3$)$_2$—, and a single bond. The chemical compound represented by Chemical Formula (I) may be at least one of:

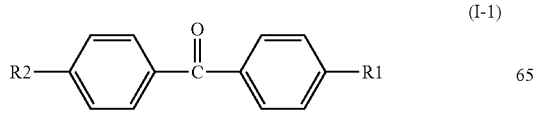

(I-1)

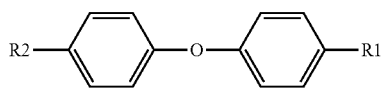

(I-2)

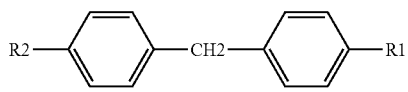

(I-3)

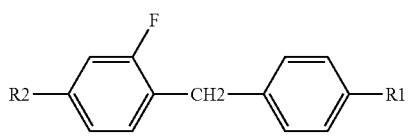

(I-4)

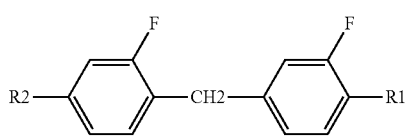

(I-5)

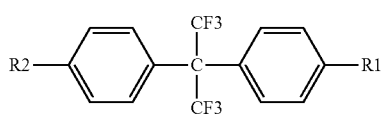

(I-6)

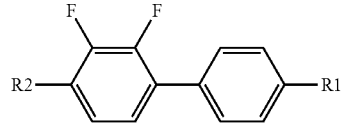

(I-7)

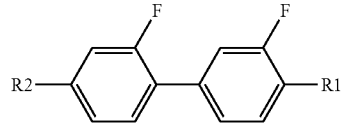

(I-8)

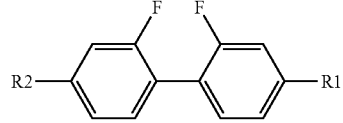

(I-9)

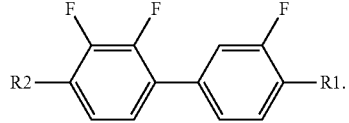

(I-10)

Also, the chemical compound of the monomer may be represented by Chemical Formula (II), (III), and (IV):

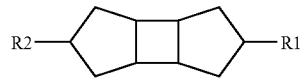

(II)

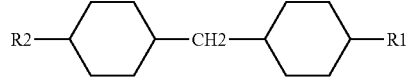

(III)

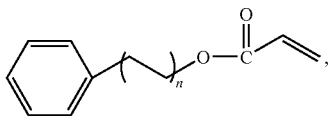

(IV)

wherein, each of R1 and R2 includes at least one of acrylate, a vinyl group, and an epoxy group, and n may be 0 to 2.

This monomer may be polymerized by initiating the reaction of an initiator by irradiating light. Here, the light may be, for example, ultraviolet, and the initiator may be, for example one selected from the compound of benzophenone, 1-hydroxy cyclohexyl phenyl ketone, 2,4,6-trimethylbenzoyl diphenylphosphine oxide, 2-hydroxy-2-methyl-1-phenyl-propan-1-one, 2-isopropylthioxanthone, 2-methyl-1-[4-(methylthio)phenyl]-2-morpholino-propan-1-one, 4-methylbenzophenone, 4,4'-bis(diethylamine)benzophenone, 2,2'-bis(o-chlorophenyl)-4,5,4',5'-tetraphenyl-1,2'-biimidazole, methyl o-benzoyl benzoate, 2,4,6-trimethylbenzophenone, and 4-methylbenzophenone, the compound of 2,4,6-trimethylbenzophenone, 2-methylbenzophenone, 3-methylbenzophenone, and 4-methylbenzophenone, ethyl p-N,N'-dimethylaminobenzoate, 2-ethylhexyl-4-dimethylaminobenzoate, 4-phenylbenzophenone, benzoin ethyl ether, 4-(p-tolylthio) benzophenone, and tris(4-dimethylaminophenyl)methane.

The contents of the monomer may be in the range of, for example, about 0.05 to about 0.5 wt % with respect to the contents of the liquid crystal material 310.

This monomer has a similar structure to the liquid crystal molecules 310, does not react with the liquid crystal molecules 310, and is readily polymerized by irradiating. Accordingly, the monomer may readily fix the pre-tilt angel of the liquid crystal molecules 310 disposed close to the substrates 110 and 210.

For example, the pixel electrode has a plurality of slits in the LCD according to the previous exemplary embodiment, and the fringe field is formed on the edge of the pixel electrode with the respect to the center of the slits. While, the LC molecules disposed close to the slits are readily aligned by the fringe field in a perpendicular direction to the fringe field, the LC molecules disposed far from the slits are aligned with a random motion.

In the present exemplary embodiment of the invention, the pre-tilt angle is formed on the LC molecules 310 by previously applying the voltage to the electrodes in the manufacturing process of the LCD, and the pre-tilt angles of the LC molecules 310 are fixed by the pre-tilt fixing polymer 13. Accordingly, the LC molecules disposed far from the slits as well as the LC molecules disposed close to the slits may fix the pre-tilt angle. Accordingly, when driving the LCD, the random motion of the LC molecules may be decreased such that the response time of the LC molecules may be improved, and the irregular arrangement of the LC molecules may be prevented.

Now, a manufacturing method of the LCD of FIGS. 1 and 2 according to exemplary embodiments of the present invention will be described with reference to FIGS. 4 and 5 as well as FIGS. 1 and 2.

Figure 4:
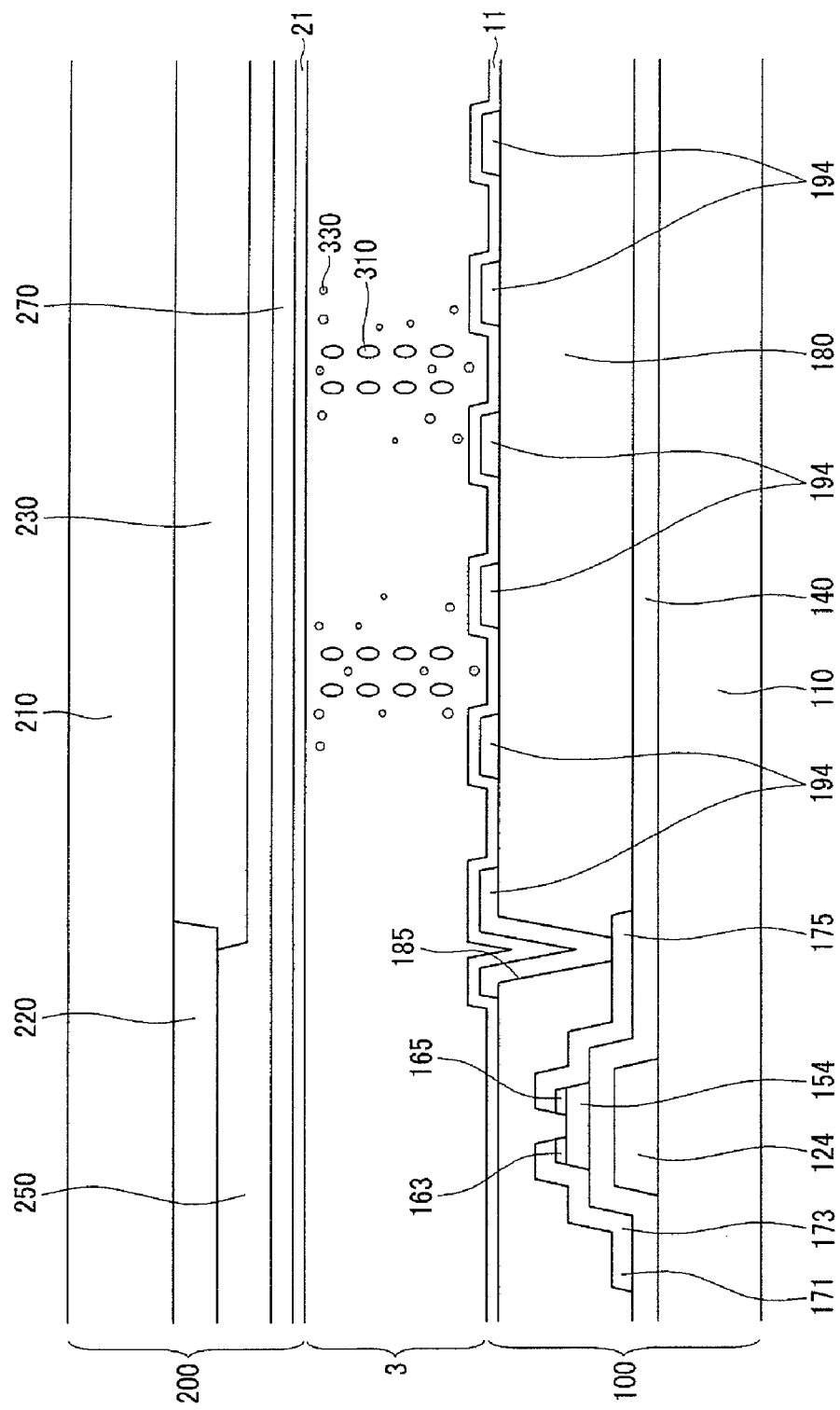
FIGS. 4 and 5 are sectional views sequentially showing intermediate steps of a manufacturing method thereof according to an exemplary embodiment of the present invention.
Figure 5:
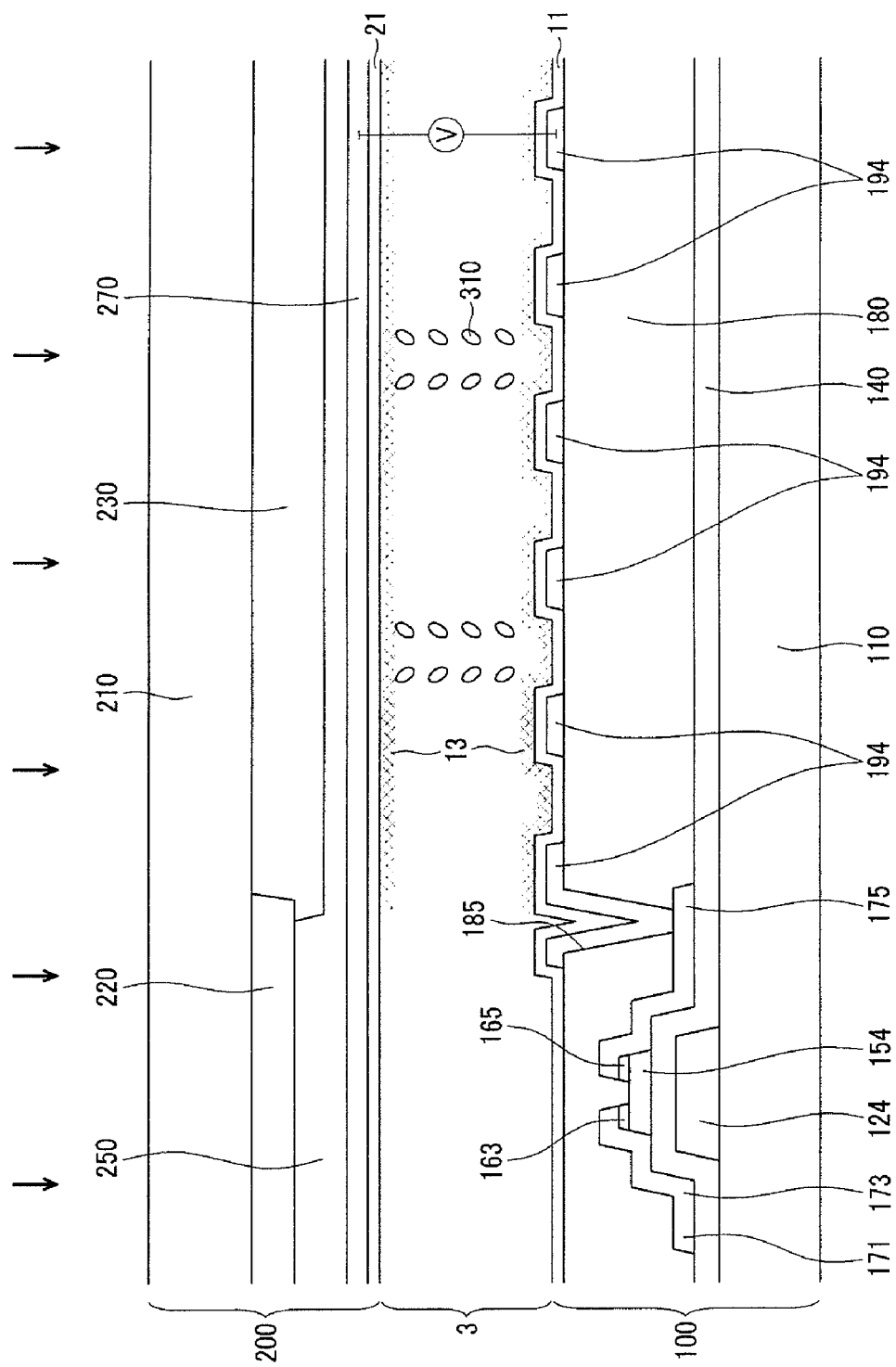

FIGS. 4 and 5 are sectional views sequentially showing intermediate steps of a manufacturing method thereof according to an exemplary embodiment of the present invention.

A thin film transistor array panel 100 is completed by sequentially forming a gate line 121 including a gate electrode 124, a gate insulating layer 140, a semiconductor layer 154, ohmic contact layers 163 and 165, a data line 171 including a source electrode 173 and a drain electrode 175, a passivation layer 180, a pixel electrode 191 including a plurality of oblique portions 194, and an alignment layer 11 on an insulating substrate 110.

Further, a common electrode panel 200 is completed by sequentially forming a light blocking member 220, a color filter 230, an overcoat 250, a common electrode 270, and an alignment layer 21 on an insulating substrate 210. Because the common electrode 270 does not have a slope member for determining the slope direction of the liquid crystal molecules 310, the manufacturing method may be simplified.

Next, referring to FIG. 5, the thin firm transistor array panel 100 and the common electrode panel 200 are aligned opposite to each other, and a liquid crystal mixture including a liquid crystal material 310, a monomer material 330, and a photo polymerization initiator is injected between the two panels 100 and 200. As a substitution of this method, the liquid crystal mixture 310 may be dropped on one of the thin firm transistor array panel 100 or the common electrode panel 200.

Next, referring to FIG. 5, a voltage of about 3 to about 3.5 V for forming a pre-tilt angle is applied between the pixel electrodes 191 and the common electrode 270. The liquid crystal molecules 310 are re-aligned with a pre-tilt angle of about 88 to about 90 degrees, and for example about 88.5 to about 90 degrees, with respect to the substrates 110 and 210.

Next, light with a wave length of about 320 to about 380 nm is irradiated to the panels 100 and 200 under the application of a voltage to polymerize the monomers 330 such that the pre-tilt fixing polymer 13 is formed close to the alignment layers 11 and 21.

As shown in FIGS. 1 and 2, the pre-tilt fixing polymers 13 maintain the pre-tilt angle of the liquid crystal molecules 310 closely disposed on the alignment layers 11 and 21 after the voltage for the pre-tilt angle is no longer applied.

An LCD according to another exemplary embodiment of the present invention will now be described in detail with reference to FIG. 6.

Figure 6:
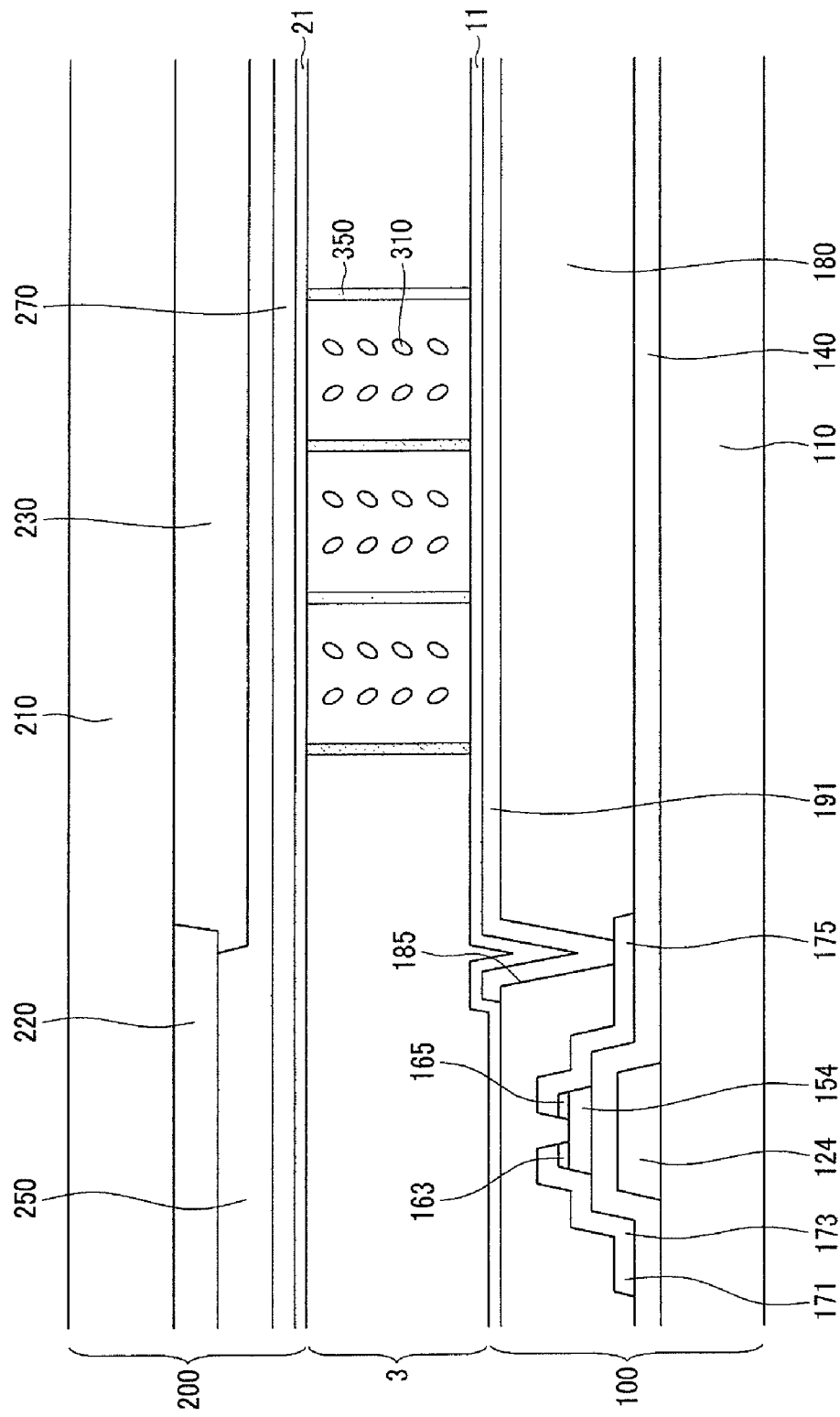
FIG. 6 is a sectional view of the LCD according to an exemplary embodiment of the present invention.

FIG. 6 is a sectional view of an LCD according to an exemplary embodiment of the present invention.

Differently from the previous exemplary embodiment, a pixel electrode does not have a plurality of cutouts, such as micro slits, and the polymer used as a partition for enclosing the liquid crystal material 310 is provided as an example in this embodiment.

Overlapping descriptions with the previous embodiment are omitted.

Like the previous exemplary embodiment in the TFT array panel 100, a plurality of gate lines 121 and a plurality of storage electrode lines 131 are formed on an insulating substrate 110, and a gate insulating layer 140 is formed on the gate lines 121 and the storage electrode lines 131. A plurality of semiconductors 154 and a plurality of ohmic contacts 163 and 165 in pairs are formed on the gate insulating layer 140, and a plurality of data lines 171 and a plurality of drain electrodes 175 are formed on the ohmic contacts 163 and 165 and the gate insulating layer 140.

A passivation layer 180 is formed on the data lines 171, the drain electrodes 175, and the exposed portions of the semiconductors 154, and a plurality of pixel electrodes 191 are formed on the passivation layer 180.

Here, the pixel electrodes 191 do not have a plurality of cutouts such as micro slits, differently from the previous exemplary embodiment.

In the common electrode panel 200 according to the current exemplary embodiment of the present invention, a light blocking member 220 and a plurality of color filters 230 are sequentially formed on the substrate 210. An overcoat 250 and a common electrode 270 are formed on the color filters 230.

Alignment layers 11 and 21 that may be homeotropic are coated on inner surfaces of the panels 100 and 200, and polarizers are provided on outer surfaces of the panels 100 and 200.

The LC layer 3 formed between the two panels 100 and 200 includes the liquid crystal material 310 and a polymer 350.

The LC layer 3 may be, for example, a nematic liquid crystal material having negative dielectric anisotropy.

The liquid crystal molecules 310 disposed close to the panels 100 and 200 are pre-tilted with a pre-tilt angle of about 88-90 degrees, and for example about 88.5-90 degrees, with the surface of the substrates 110 and 210. This pre-tilt angle may formed by a predetermined electric field applied to the electrodes 191 and 270 in the manufacturing process, and be maintained by being fixed by the polymer 350. The predetermined electric field may be larger than about 50% of the driving voltage of the display device. For example, when the driving voltage is in the range of about 5.0 to about 7.0 V, the predetermined electric field for forming the pre-tilt angle is in the range of about 3.0 to about 3.5 V.

The polymer 350 may be formed by, for example, polymerizing monomers, as described in the previous embodiment. Here, the contents of the monomers may be, less than 10 wt %, and for example about 2 to about 10 w %, with respect to the contents of the liquid crystal material 310.

The polymer 350 has a function of determining the slope direction of the liquid crystal molecules 310. That is to say, the polymer 350 forms a plurality of partitions for defining a plurality of domains, the directions of the liquid crystal molecules 310 are sloped in a group with a predetermined direction by the electric field generated between the pixel electrodes 191 and the common electrode 270 in the domains defined by the partitions.

The planer shape of the polymers 350 according to this exemplary embodiment may be the same as the shapes of the pixel electrodes of the previous exemplary embodiment. That is to say, the polymer 350 may include include a transverse portion extended in the transverse direction, a longitudinal portion extended in the longitudinal direction, and a plurality of oblique portions extended from the transverse and the longitudinal portions in the oblique direction.

The transverse and the longitudinal portions divide each pixel into four regions, and the four regions respectively form a domain where the directions of the liquid crystal molecules 310 are aligned in a predetermined direction in a group by the electric field generated between the pixel electrodes 191 and the common electrode 270.

The oblique portions are respectively disposed in four regions divided by the transverse and longitudinal portions. Also, the oblique portions obliquely extend with left upper, left lower, right upper, and right lower directions and are symmetrical with respect to the transverse and longitudinal portions. The oblique portions in each domain are parallel to each other, and may form about a 45 degree angle with the polarization axes of the polarizers.

The widths of the oblique portions may be narrower than the widths of the transverse and longitudinal portions.

Now, a manufacturing method of the LCD according to embodiments of the present invention will be described with reference to FIG. 7.

FIG. 6 is a sectional view showing one intermediate step of a manufacturing method thereof according to an exemplary embodiment of the present invention.

The manufacturing method according to this embodiment is the same as that of the previous exemplary embodiment until the step for forming a liquid crystal mixture between the two panels 100 and 200.

Next, a voltage of about 3 to about 3.5 V for forming a pre-tilt angle is applied between the pixel electrodes 191 and the common electrode 270. The liquid crystal molecules 310 are re-aligned with a pre-tilt angle of about 88 to about 90 degrees, and for example about 88.5 to about 90 degrees, with respect to the substrates 110 and 210.

Figure 7:
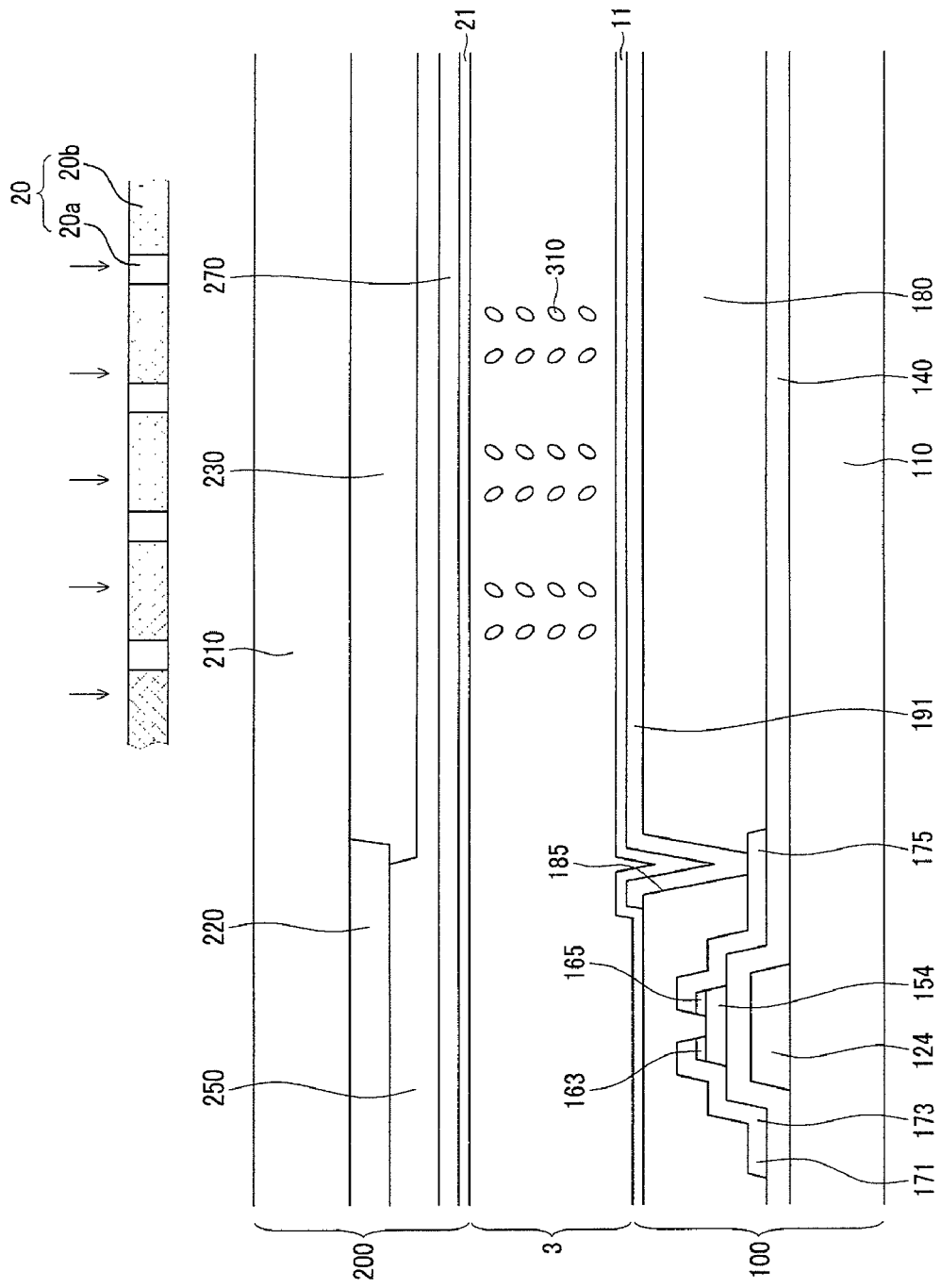
FIG. 7 is a sectional view showing one intermediate step of the manufacturing method according to an exemplary embodiment of the present invention.

Next, referring to FIG. 7, a mask 20 is aligned on the substrate. The mask 20 has a plurality of transmission regions 20a and a plurality of light blocking regions 20b. The transmission regions 20a are formed as a plurality of micro slits and have the same pattern as the polymer 350 that will be formed. That is to say, the planar shape of the transmission regions 20a is manufactured with the same planar shape as the transverse portions 192, the longitudinal portions 193, and the oblique portions 194 in the previous exemplary embodiment.

Next, light with a wave length of about 320 to about 380 nm is irradiated to the panels 100 and 200 under the application of a voltage to polymerize the monomers such that the polymer 350 is formed of a pattern having the transverse portions, the longitudinal portions, and the oblique portions due to the irradiation of the light using the mask 20.

The polymer 350 maintains the pre-tilt angle of the liquid crystal molecules 310 the voltage for the pre-tilt angle is no longer applied and aligns the liquid crystal molecules 310 enclosed in each domain with various directions such that the viewing angle may improved.

Also, the common electrode 270 and the pixel electrodes 191 do not have cutouts such that the manufacturing method may be simplified.

An LCD according to another exemplary embodiment of the present invention will now be described in detail with reference to FIGS. 8 and 9.

Figure 8:
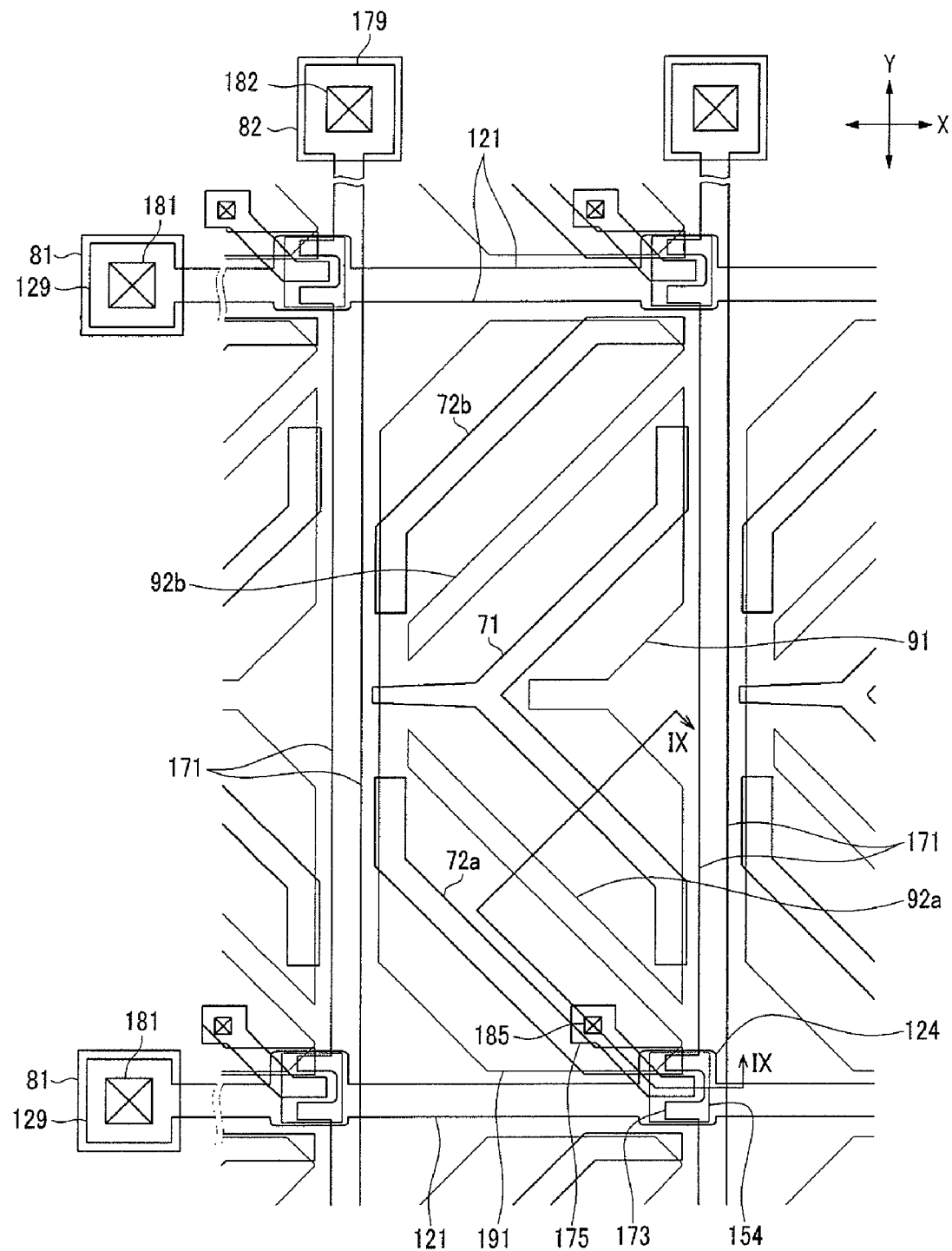
FIG. 8 is a layout view of an LCD according to an exemplary embodiment of the present invention.
Figure 9:
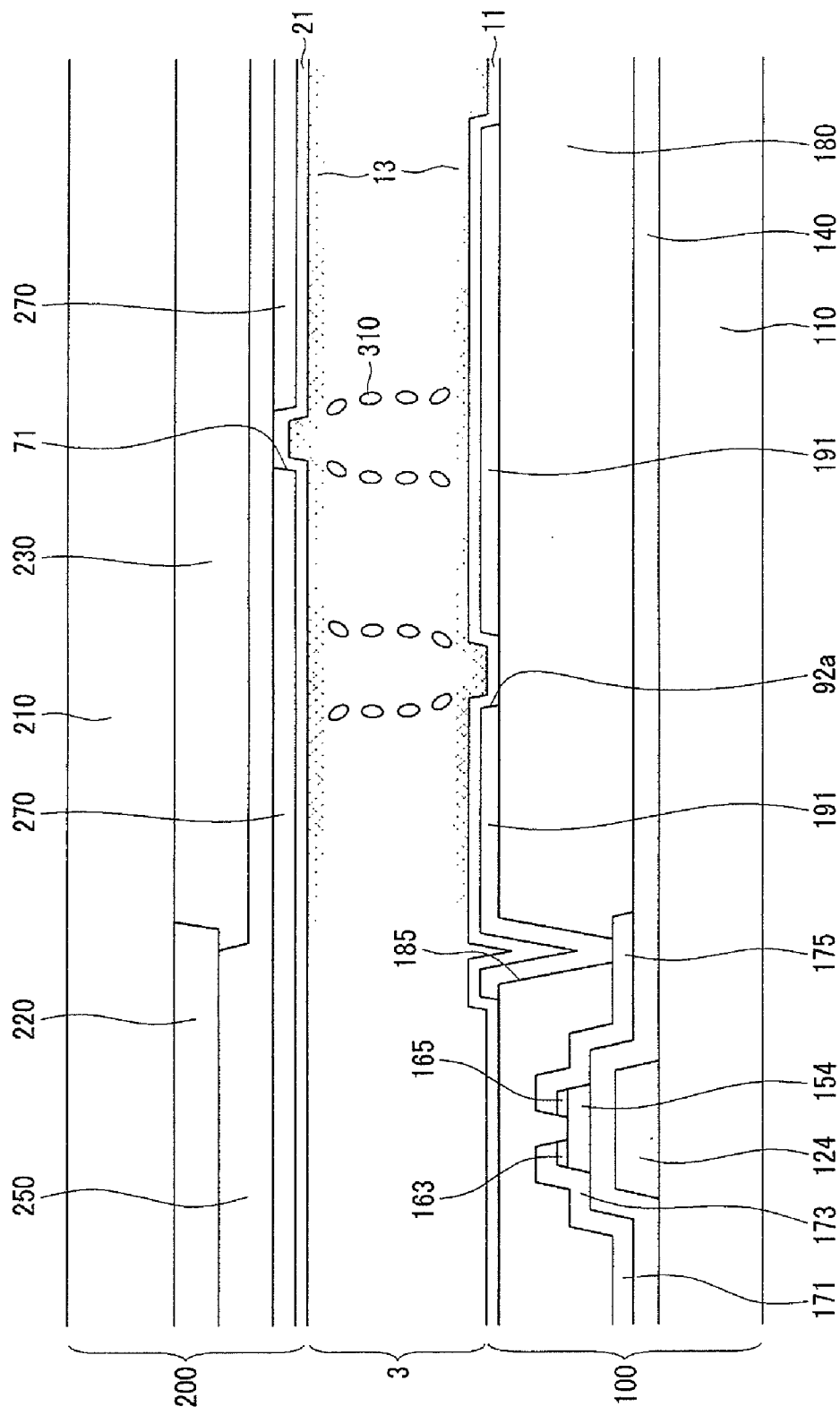
FIG. 9 is a sectional view of the LCD shown in FIG. 8 taken along the line IX-IX.

FIG. 8 is a layout view of an LCD according to another exemplary embodiment of the present invention, and FIG. 9 is a sectional view of the LCD shown in FIG. 8 taken along the line IX-IX.

Differently from the previous exemplary embodiments, a thin film transistor array panel 100 and a common electrode panel 200 have a plurality of cutouts.

Layered structures of the panels 100 and 200 according to this exemplary embodiment are almost the same as those shown in FIGS. 1 to 2.

Overlapping descriptions with the previous exemplary embodiments will be omitted.

Regarding the TFT array panel 100, a plurality of gate lines 121 including gate electrodes 124 and end portions 129 are formed on a substrate 110, and then a gate insulating layer 140, a plurality of semiconductors 154, and a plurality of ohmic contacts 163 and 165 in pairs are sequentially formed thereon. A plurality of data lines 171 including source electrodes 173 and end portions 179, and a plurality of drain electrodes 175 are formed on the ohmic contacts 163 and 165, and a passivation layer 180 is formed thereon. A plurality of contact holes 181, 182, and 185 are provided at the passivation layer 180 and the gate insulating layer 140. A plurality of pixel electrodes 191, and a plurality of contact assistants 81 and 82 are formed on the passivation layer 180, and an alignment layer 11 is coated thereon.

Regarding the common electrode panel 200, a light blocking member 220, a plurality of color filters 230, a common electrode 270, and an alignment layer 21 are formed on an insulating substrate 210.

Different from the LCD shown in FIGS. 1 to 2, each pixel electrode 191 is chamfered at its four corners and the chamfered edges of each pixel electrode 191 make an angle of about 45 degrees with the gate lines 121.

Each pixel electrode 191 has a lower cutout 92a, a center cutout 91, and an upper cutout 92b, which partition each pixel electrode 191 into a plurality of partitions. The cutouts 91 to 92b substantially have inversion symmetry with respect to an imaginary transverse line bisecting each pixel electrode 191.

The lower and upper cutouts 92a and 92b obliquely extend from a right edge of the pixel electrode 191 near an upper right corner approximately to a center of a left edge of the pixel electrode 191 and overlap the third and fourth storage electrodes 133c and 133d. The lower and upper cutouts 92a and 92b are disposed at lower and upper halves of the pixel electrode 191, respectively, which can be divided by the imaginary transverse line. The lower and upper cutouts 92a and 92b make an angle of about 45 degrees to the gate lines 121, and they extend substantially perpendicular to each other.

The center cutout 91 extends along the imaginary transverse line and has an inlet from the right edge of the pixel electrode 191, which has a pair of inclined edges substantially parallel to the lower cutout 92a and the upper cutout 92b, respectively.

Accordingly, the lower half of the pixel electrode 191 is partitioned into two lower partitions by the lower cutout 92a and the upper half of the pixel electrode 191 is also partitioned into two upper partitions by the upper cutout 92b. The number of partitions or the number of cutouts may be varied depending on design factors, such as, for example, the size of pixels, the ratio of the transverse edges and the longitudinal edges of the pixel electrodes, the type and characteristics of the liquid crystal layer 3, and so on.

The common electrode 270 has a plurality of sets of cutouts 71 to 72b.

A set of cutouts 71 to 72b faces a pixel electrode 191, and includes a lower cutout 72a, a center cutout 71, and an upper cutout 72b. Each of the cutouts 71 to 72b is disposed between adjacent cutouts 91 to 92b of the pixel electrode 191 or between a cutout 92a or 92b and a chamfered edge of the pixel electrode 191. In addition, each of the cutouts 71 to 72b has at least an oblique portion extending parallel to the lower cutout 92a or the upper cutout 92b of the pixel electrode 191, and the distances between two adjacent cutouts 71 to 72b and 91 to 92b, the oblique portions thereof, the oblique edges thereof, and the chamfered edges of the pixel electrode 191, which are parallel to each other, are substantially the same. The cutouts 71 to 72b substantially have inversion symmetry with respect to the above-described transverse line bisecting the pixel electrode 191, and are wider than the cutouts 91 to 92b of the pixel electrode 191.

Each of the lower and upper cutouts 72a and 72b includes an oblique portion extending approximately from a left edge of the pixel electrode 191 to approximately a lower or upper edge of the pixel electrode 191, and transverse and longitudinal portions extending from respective ends of the oblique portion along edges of the pixel electrode 191, overlapping the edges of the pixel electrode 191, and making obtuse angles with the oblique portion.

The center cutout 71 includes a central transverse portion extending approximately from the left edge of the pixel electrode 191 along the transverse central line of the pixel electrode 191, a pair of oblique portions extending from an end of the central transverse portion approximately to a right edge of the pixel electrode 191 and making obtuse angles with the central transverse portion, and a pair of terminal longitudinal portions extending from the ends of the respective oblique portions along the right edge of the pixel electrode 191, overlapping the right edge of the pixel electrode 191, and making obtuse angles with the respective oblique portions.

The number of cutouts 71 to 72b may be varied depending on design factors, and the light blocking member 220 may also overlap the cutouts 71 to 72b to block light leakage through the cutouts 71 to 72b.

Upon application of a common voltage to the common electrode 270 and a data voltage to the pixel electrodes 191, an electric field substantially perpendicular to the surfaces of the panels 100 and 200 is generated. The LC molecules tend to change their orientations in response to the electric field such that their long axes are perpendicular to the field direction. The common electrode 270 and the pixel electrodes 191 are used as a field-generating electrode.

The cutouts 91 to 92b and 71 to 72b of the electrodes 191 and 270 and the edges of the pixel electrodes 191 distort the electric field to have a horizontal component that is substantially perpendicular to the edges of the cutouts 91 to 92b and 71 to 72b and the edges of the pixel electrodes 191.

One set of cutouts 91-92b and 71-72b divides a pixel electrode 191 into a plurality of sub-areas and each sub-area has two major edges forming an oblique angle with the main edges of the pixel electrode 191. The major edges of sub-areas make an angle of about 45 degrees with the transmissive axes of the polarizers 12 and 22 to obtain maximum transmittance.

The cutouts 91-92b and 71-72b of the electrodes 191 and 270 and the edges of the pixel electrodes 190 distort the electric field to have a horizontal component that is substantially perpendicular to the edges of the cutouts 91-92b and 71-72b and the edges of the pixel electrodes 190. Accordingly, the LC molecules in each sub-area are tilted in a certain direction by the horizontal component and the azimuthal distribution of the tilt directions is localized to four directions, thereby increasing the viewing angle of the LCD.

The shapes and the arrangements of the cutouts 91-92b and 71-72b may be modified.

At least one of the cutouts 91-92b and 71-72b can be substituted with protrusions or depressions. The protrusions may be made of, for example, organic or inorganic material and disposed on or under the field-generating electrodes 191 or 270.

Alignment layers 11 and 21 that may be homeotropic are coated on inner surfaces of the panels 100 and 200, and polarizers are provided on outer surfaces of the panels 100 and 200.

The LC layer 3 formed between the two panels 100 and 200 includes the liquid crystal material 310 and a pre-tilt fixing polymer 13.

The descriptions of the liquid crystal material 310 and the pre-tilt fixing polymer 13 are the same as that of the first embodiment.

That is to say, the LC layer 3 may be, for example, a nematic liquid crystal material having negative dielectric anisotropy. The liquid crystal molecules 310 disposed close to the panels 100 and 200 are pre-tilted with a pre-tilt angle of about 88-90 degrees, and for example about 88.5-90 degrees, with respect to the surface of the substrates 110 and 210. This pre-tilt angle may be formed by a voltage for the pre-tilt angle generated between the electrodes 191 and 270 in the range of about 3.0 to about 3.5 V in the manufacturing process.

The pre-tilt fixing polymer 13 may be formed by, for example, polymerizing the monomers represented in the first embodiment.

In the first exemplary embodiment, the fringe field is formed on the edge of the electric field generating electrode with respect to the center of the micro slits. However, in this exemplary embodiment, the fringe field is formed on the edge of the electric field generating electrode with respect to the center of the plurality of cutouts 71-72b and 91-92b.

As above described, the pre-tilt angle of the LC molecules is formed by previously applying a voltage to the electrodes in the manufacturing process of the LCD, and the pre-tilt angles of the LC molecules are fixed by the pre-tilt fixing polymer. Accordingly, the LC molecules disposed far from the slits, as well as the LC molecules disposed close to the slits, may have a fixed pre-tilt angle. Accordingly, with exemplary embodiments of the present invention, when driving the LCD, the random motion of the LC molecules may be decreased such that the response time of the LC molecules may be improved, and a reverse arrangement of the LC molecules may be prevented.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal composition, comprising:
a liquid crystal material and a polymer fixing a pre-tilt angle of liquid crystal molecules of the liquid crystal material,
wherein the polymer is formed by polymerizing at least one selected from monomers represented by Chemical Formulas (I), (II), (III), and (IV),

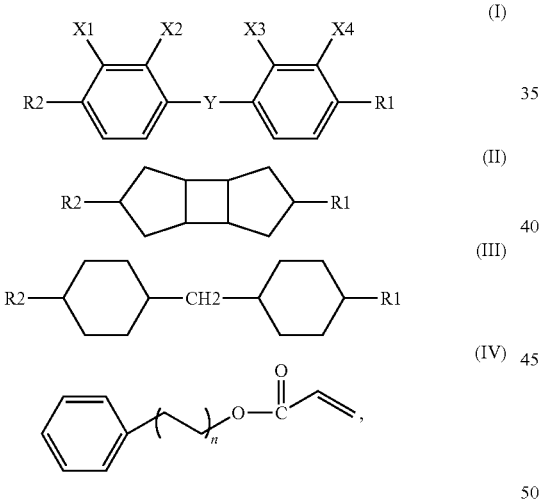

wherein, each of R1 and R2 includes at least one of acrylate, a vinyl group, and an epoxy group, n is 0 to 2, each of X1 to X4 is hydrogen or fluorine, Y is at least one selected from —$CH_2$—, —O—, —CO—, —C($CF_3$)$_2$—, and a single bond.

2. The liquid crystal composition of claim 1, wherein the contents of the monomers are in a range of about 0.05 to about 0.5 wt % with respect to the contents of the liquid crystal material.

3. The liquid crystal composition of claim 1, wherein the contents of the monomers is in a range of about 2 to about 10 wt % with respect to the contents of the liquid crystal material.

4. The liquid crystal composition of claim 1, wherein the liquid crystal molecules of the liquid crystal material have a pre-tilt angle in a range of about 88 to about 90 degrees.

5. The liquid crystal composition of claim 1, wherein the monomer represented by Chemical Formula (I) is at least one selected from monomers represented by Chemical Formulas (I-1), (I-2), (I-3), (I-4), (I-5), (I-6), (I-7), (I-8), (I-9), and (I-10),

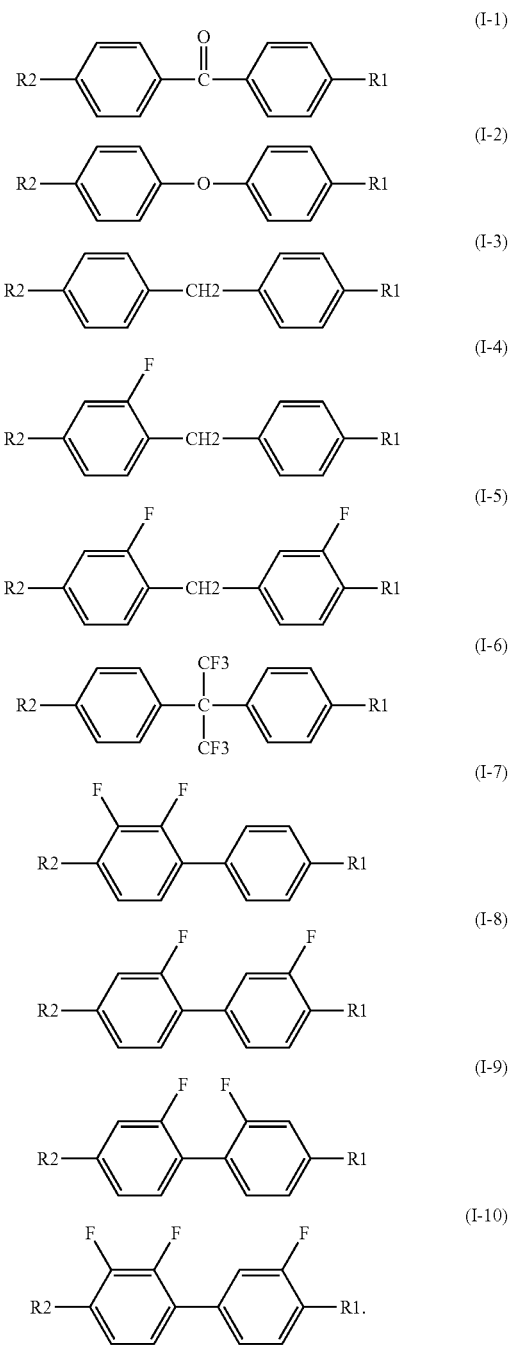

6. The liquid crystal composition of claim 1, wherein the polymer is formed by irradiating light to a liquid crystal mixture including the liquid crystal material and the monomers.

* * * * *